United States Patent Office 3,362,878
Patented Jan. 9, 1968

3,362,878
PHARMACEUTICAL COMPOSITIONS AND METHODS UTILIZING SUBSTITUTED BICYCLO[2.2.2]-OCTANES
Jack A. Snyder, Claymont, Del., assignor to E. I. du Pont de Nemours and Company, Wilmington, Del., a corporation of Delaware
No Drawing. Filed Dec. 28, 1966, Ser. No. 605,190
22 Claims. (Cl. 167—65)

This application is a continuation-in-part of copending application S.N. 569,057, filed Aug. 1, 1966, now abandoned, which in turn is a division of and continuation-in-part of application S.N. 449,896, filed Apr. 21, 1965, now U.S. Patent No. 3,308,160, which in turn is a continuation-in-part of application S.N. 290,652, filed June 26, 1963, now abandoned.

This invention relates to substituted bicyclo[2.2.2]octanes. More particularly, this invention refers to novel 4-phenyl and 4-substituted phenyl bicyclo[2.2.2]octane-1-amines and their use as antidepressants.

According to the present invention I have discovered a novel class of compounds which are useful in pharmaceutical applications. Particularly, they are antidepressant agents, as shown by their ability to antagonize tetrabenazine-induced sedation in mice.

The compounds of this invention have the formula (1)

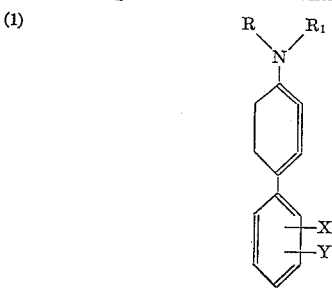

where:

R and $R_1$ can be the same or different and each are hydrogen or alkyl of 1 through 4 and preferably 1 through 2 carbon atoms, or allyl, and where R and $R_1$ can be joined together to form $-(CH_2)_n-$ where $n$ is 4, 5 or 6, thus together with the amine nitrogen forming a pyrrolidino, piperidino or hexamethyleneimino group respectively; and X and Y are hydrogen, methyl, ethyl, chlorine, bromine, fluorine, trifluoromethyl, nitro, amino, monoalkylamino where the alkyl group has 1 through 4 and preferably 1 through 2 carbons, dialkylamino where each alkyl group has 1 through 4 and preferably 1 through 2 carbons, hydroxy, cyano, alkoxy of 1 through 4 and preferably 1 through 2 carbons, carboxy, and alkoxycarbonyl where the alkyl group has 1 through 2 carbons.

Also included within the scope of this invention are salts of the compounds of Formula 1. These salts have the following formula (2)

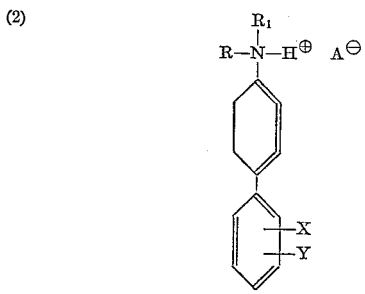

where R, $R_1$, and X and Y have the same meaning as above and where A is a non-toxic anion.

Representative of the salts of Formula 2 are the hydrochloride, sulfate, phosphate, acetate, succinate, adipate, propionate, tartrate, citrate and bicarbonate. Preferred anions are those derived from hydrochloric acid, acetic acid, phosphoric acid, succinic acid, carbonic acid and citric acid.

Compounds of the present invention are particularly outstanding where R and $R_1$ are hydrogen, X is hydrogen, and where Y is hydrogen or fluorine. Besides hydrogen or fluorine, it is preferred that Y be hydroxy, chlorine, trifluoromethyl or alkoxy.

The free amines of this invention are generally colorless, low-melting solids, soluble in organic solvents. They are moderately basic, comparing with the alkyl amines in this respect. The salts are usually colorless, high-melting, crystalline materials, sparingly soluble in water and insoluble in organic solvents.

The compounds of this invention can be prepared as follows:

4-phenylbicyclo[2.2.2]octane-1-amine is conveniently prepared starting with 4-hydroxyl-1-phenylbicyclo[2.2.2]octan-2-one, removing the carbonyl group from this compound with hydrazine by the Wolff-Kishner sequence, followed by replacement of the hydroxyl group with the acetamido group by the Ritter reaction, followed by alkaline hydrolysis.

Compounds of this invention having the substituents X hydrogen and Y other than hydrogen can be made by nitration of the phenyl ring of an 1-acylamido-4-phenyl-bicyclo[2.2.2]octane followed by mild reduction to the amino compound, diazotization, and reaction of the diazonium salt with a variety of appropriately selected reagents. Simply heating the diazonium salt in aqueous solution gives the phenol. Reaction with a cuprous halide gives the halo-compound, and reaction with cuprous cyanide gives the nitrile. The phenol is alkylated with dialkyl sulfate and base or an alkyl halide and base to give the alkoxy-compound. The nitrile is hydrolyzed to the carboxylic acid, which is converted to the ester by one of the usual methods such as an alcohol and hydrogen chloride, or the carboxyl group is converted to the trifluoromethyl group with sulfur tetrafluoride.

As will be noted, nitration in the above sequence produces primarily the para substituted derivative although some ortho and meta substituted products will be formed. Separation of the respective ortho, meta and para-nitro isomers, followed by reduction and diazonium salt formation, gives the desired substituted phenyl 1-acylamido bicylcooctane product.

If, instead of diazotization, the amino group is acylated and reduced with lithium aluminum hydride, it is converted to the alkylamino group. Repetition of this gives the dialkylamino grouping.

After the desired transformation of the phenyl ring has been carried out, the 1-acylamido group is converted to the amino group by hydrolysis, or it can be reduced with lithium aluminum hydride to the 1-alkylamino group, and then further acylated and reduced to the 1-dialkylamino group.

An alternative method of synthesis of the compounds of this invention starts with 4-phenylbicyclo[2.2.2]oct-2-ene-1-carboxylic acid (for the preparation of 4-phenyl-bicyclo[2.2.2]octane-1-amine) or a 4-(substituted phenyl) bicyclo[2.2.2]oct-2-ene-1-carboxylic acid (for the preparation of the 4-(substituted phenyl)bicyclo[2.2.2]octane-1-amines.) The preparation of these compounds which can serve as intermediates for preparation of compounds of the present invention is disclosed in copending application Ser. No. 377,132, filed June 22, 1964, now abandoned, and assigned to my assignee.

The unsaturated acid is reduced, conveniently by hydrogen-platinum, to yield the saturated 4-phenyl or 4-(substituted phenyl) - bicyclo[2.2.2]octane-1-carboxylic acid, and this is converted to the 4-phenyl or 4-(substituted phenyl)bicyclo[2.2.2]octane-1-amine by the Hoffmann, Curtius or Schmidt reactions. The Schmidt reaction, involving the use of sodium azide and sulfuric acid, is particularly convenient.

N-alkyl and N,N-dialkyl amines are made by acylation and reduction of the N-acyl compound. Although other means such as catalytic hydrogenation can be used, lithium aluminum hydride is excellent for this. Acylation can be carried out with many different reagents such as acyl halides, acid anhydrides, carboxylic acid esters, and free carboxylic acids (especially in the case of the use of formic acid to make the formyl compounds). An adaptation of this method, where the acylating agent is a dicarboxylic acid anhydride, is used to make the alkyleneimine compounds. Alternatively, the amino compounds can be alkylated directly with alkyl halides and base or dialkyl sulfates and base, but this is less preferred than acylation and reduction.

Another method for making the compounds of this invention involves the ammonolysis or aminolysis of the methanesulfonic acid esters of the 4-hydroxy-1-phenyl (and substituted phenyl) bicyclo[2.2.2]octanes obtained from the Wolff-Kishner sequence described earlier. By appropriate choice of the amine reagent, groups R and $R_1$ can be varied almost at will. Of course, the use of ammonia as the reagent yields the primary amine.

Illustrative of the compounds of this invention are the following. Non-toxic salts of these compounds are of course included as mentioned above:

4-phenylbicyclo[2.2.2]octane-1-amine
N-methyl-4-phenylbicyclo[2.2.2]octane-1-amine
N,N-dimethyl-4-phenylbicyclo[2.2.2]octane-1-amine
N-ethyl-4-phenylbicyclo[2.2.2]octane-1-amine
N-ethyl-N-methyl-4-phenylbicyclo[2.2.2]octane-1-amine
N,N-diethyl-4-phenylbicyclo[2.2.2]octane-1-amine
N-propyl-4-phenylbicyclo[2.2.2]octane-1-amine
N-methyl-N-propyl-4-phenylbicyclo[2.2.2]octane-1-amine
N-methyl-N-isopropyl-4-phenylbicyclo[2.2.2]octane-1-amine
N-isopropyl-4-phenylbicyclo[2.2.2]octane-1-amine
N-ethyl-N-propyl-4-phenylbicyclo[2.2.2]octane-1-amine
N-ethyl-N-isopropyl-4-phenylbicyclo[2.2.2]octane-1-amine
N,N-dipropyl-4-phenylbicyclo[2.2.2]octane-1-amine
N,N-diisopropyl-4-phenylbicyclo[2.2.2]octane-1-amine
N-butyl-N-methyl-4-phenylbicyclo[2.2.2]octane-1-amine
N-isobutyl-N-methyl-4-phenylbicyclo[2.2.2]octane-1-amine
N-sec-butyl-N-methyl-4-phenylbicyclo[2.2.2]octane-1-amine
N-tert-butyl-N-methyl-4-phenylbicyclo[2.2.2]octane-1-amine
N-isobutyl-4-phenylbicyclo[2.2.2]octane-1-amine
N-sec-butyl-4-phenylbicyclo[2.2.2]octane-1-amine
N-tert-butyl-4-phenylbicyclo[2.2.2]octane-1-amine
N-(4-phenylbicyclo[2.2.2]octyl-1-)pyrrolidine
N-(4-phenylbicyclo[2.2.2]octyl-1-)piperidine
N-(4-phenylbicyclo[2.2.2]octyl-1-)hexamethyleneimine
N-(4-p-chlorophenylbicyclo[2.2.2]octyl-1-)pyrrolidine
N-(4-p-methoxyphenylbicyclo[2.2.2]octyl-1-)piperidine
N-(4-p-trifluoromethylphenylbicyclo[2.2.2]octyl-1-)hexamethyleneimine
N-(4-m-fluorophenylbicyclo[2.2.2]octyl-1-)pyrrolidine
N-(4-o-bromophenylbicyclo[2.2.2]octyl-1-)piperidine
N-(4-o-aminophenylbicyclo[2.2.2]octyl-1-)hexamethyleneimine
4-o-tolylbicyclo[2.2.2]octane-1-amine
4-m-tolylbicyclo[2.2.2]octane-1-amine
4-p-tolylbicyclo[2.2.2]octane-1-amine
4-p-ethylphenylbicyclo[2.2.2]octane-1-amine
4-(2,4-dimethylphenyl)bicyclo[2.2.2]octane-1-amine
4-(3,5-dimethylphenyl)bicyclo[2.2.2]octane-1-amine
4-(2,6-dimethylphenyl)bicyclo[2.2.2]octane-1-amine
4-(4-ethyl-2-methylphenyl)bicyclo[2.2.2]octane-1-amine
4-(2,4-diethylphenyl)bicyclo[2.2.2]octane-1-amine
4-p-fluorophenylbicyclo[2.2.2]octane-1-amine
4-p-chlorophenylbicyclo[2.2.2]octane-1-amine
4-p-bromophenylbicyclo[2.2.2]octane-1-amine
4-o-chlorophenylbicyclo[2.2.2]octane-1-amine
4-o-bromophenylbicyclo[2.2.2]octane-1-amine
4-p-trifluoromethylphenylbicyclo[2.2.2]octane-1-amine
4-o-trifluoromethylphenylbicyclo[2.2.2]octane-1-amine
4-p-nitrophenylbicyclo[2.2.2]octane-1-amine
4-p-aminophenylbicyclo[2.2.2]octane-1-amine
4-m-aminophenylbicyclo[2.2.2]octane-1-amine
4-o-aminophenylbicyclo[2.2.2]octane-1-amine
4-(p-methylaminophenyl)bicyclo[2.2.2]octane-1-amine
4-(o-butylaminophenyl)bicyclo[2.2.2]octane-1-amine
4-(p-dimethylaminophenyl)bicyclo[2.2.2]octane-1-amine
4-(m-di-sec-butylaminophenyl)bicyclo[2.2.2]octane-1-amine
4-p-hydroxyphenylbicyclo[2.2.2]octane-1-amine
4-p-methoxyphenylbicyclo[2.2.2]octane-1-amine
4-p-ethoxyphenylbicyclo[2.2.2]octane-1-amine
4-p-isobutoxyphenylbicyclo[2.2.2]octane-1-amine
4-p-carboxyphenylbicyclo[2.2.2]octane-1-amine
4-o-carboxyphenylbicyclo[2.2.2]octane-1-amine
4-p-ethoxycarbonylphenylbicyclo[2.2.2]octane-1-amine
4-p-methoxycarbonylphenylbicyclo[2.2.2]octane-1-amine
4-(2,4-difluorophenyl)bicyclo[2.2.2]octane-1-amine
4-(2-chloro-4-fluorophenyl)bicyclo[2.2.2]octane-1-amine
4-(4-fluoro-2-trifluoromethylphenyl)bicyclo[2.2.2]octane-1-amine
4-(2,4-dimethoxyphenyl)bicyclo[2.2.2]octane-1-amine
4-(3,4-dimethoxyphenyl)bicyclo[2.2.2]octane-1-amine
4-(2,4-dinitrophenyl)bicyclo[2.2.2]octane-1-amine
4-(2,4-dihydroxyphenyl)bicyclo[2.2.2]octane-1-amine
4-(4-hydroxy-2-methylphenyl)bicyclo[2.2.2]octane-1-amine
4-(4-carboxy-2-trifluoromethylphenyl)bicyclo[2.2.2]octane-1-amine
4-(2,3-diaminophenyl)bicyclo[2.2.2]octane-1-amine
N-methyl-4-p-chlorophenylbicyclo[2.2.2]octane-1-amine
N,N-dimethyl-4-p-chlorophenylbicyclo[2.2.2]octane-1-amine
N-methyl-4-p-trifluoromethylphenylbicyclo[2.2.2]octane-1-amine
N,N-dimethyl-4-p-trifluoromethylphenylbicyclo[2.2.2]octane-1-amine
N-methyl-4-p-methoxyphenylbicyclo[2.2.2]octane-1-amine
N,N-dimethyl-4-p-methoxyphenylbicyclo[2.2.2]octane-1-amine
N-ethyl-4-(p-ethylamino)phenylbicyclo[2.2.2]octane-1-amine Particularly preferred for their effectiveness and combination of desired properties are the following compounds and their salts, especially their hydrochlorides:

4-phenylbicyclo[2.2.2]octane-1-amine
N-methyl-4-phenylbicyclo[2.2.2]octane-1-amine
N-ethyl-4-phenylbicyclo[2.2.2]octane-1-amine
4-p-methoxyphenylbicyclo[2.2.2]octane-1-amine
4-p-trifluoromethylphenylbicyclo[2.2.2]octane-1-amine
4-p-fluorophenylbicyclo[2.2.2]octane-1-amine
4-p-hydroxyphenylbicyclo[2.2.2]octane-1-amine
4-p-nitrophenylbicyclo[2.2.2]octane-1-amine
4-(2,4-difluorophenyl)bicyclo[2.2.2]octane-1-amine
4-(2,6-difluorophenyl)bicyclo[2.2.2]octane-1-amine 4-p-tolylbicyclo[2.2.2]octane-1-amine
4-(2,4-dimethylphenyl)bicyclo[2.2.2]octane-1-amine This invention will be better understood by reference to the following illustrative examples in which parts and percentages are by weight unless otherwise indicated.

*Example 1*

A mixture of 42.5 grams (0.197 mole) of 4-hydroxy-1-phenylbicyclo[2.2.2]octan-2-one (J. Colonge and R. Vuillemet, Bull, Soc. Chim. France, 1961, 2235), 100 milliliters of absolute ethanol and 50 milliliters of hydrazine hydrate is refluxed 4 hours on a steam bath and allowed to cool to room temperature. The crystals which separate are filtered, washed with two 50-milliliter portions of absolute ethanol and dried in vacuo at 60° C. The yield of 4-hydroxy-1-phenylbicyclo[2.2.2]octan-2-one, hydrazone is 32.70 grams of light yellow crystals, M.P. 208.4–211.0° C.

A 500-milliliter round-bottom flask is fitted with a stirrer, condenser and thermometer and arranged for heating with a mantle. It is charged with 23.04 grams (0.100 mole) of 4-hydroxy-1-phenylbicyclo[2.2.2]octan-2-one, hydrazone, 2 milliliters of hydrazine hydrate, 250 milliliters of diethylene glycol and 20 grams of potassium hydroxide. The mixture is stirred and heated at 140° C. for three hours; then, the temperature is raised to reflux and the mixture is stirred and refluxed for 16 hours. It is cooled to room temperature, poured into 1500 milliliters of water, and the precipitate is filtered, washed with water, and dried in vacuo at 60° C. The yield is 16.1 grams of a brown solid, 4-phenylbicyclo[2.2.2]octan-1-ol. This is suitable for the next step, but it can if desired be recrystallized from water to give a purified product as matted, fine, colorless needles, M.P. 122.8–123.8° C.

A mixture of 22.7 milliliters of concentrated sulfuric acid, 11.37 grams of 4-phenylbicyclo[2.2.2]octan-1-ol and 91 milliliters of acetonitrile is refluxed one hour on a steam bath and then poured into 1000 milliliters of water. The precipitate is filtered, washed with water and dried in vacuo at 60° C. The yield of 1-acetamido-4-phenylbicyclo[2.2.2]octane is 8.63 grams of a light tan solid. This is suitable for the next step, but it can if desired be recrystallized from 1:1 absolute ethanol-water to give an off-white, crystalline solid, M.P. 231.5–233.0° C.

A mixture of 7.63 grams of 1-acetamido-4-phenylbicyclo[2.2.2]octane, 100 milliliters of diethylene glycol and 25 grams of sodium hydroxide is refluxed 48 hours in a 250-milliliter round bottom flask with stirrer, thermometer and condenser. It is cooled to room temperature, diluted with 300 milliliters of water and steam-distilled until the distillate is clear. The distillate is made strongly acidic with concentrated hydrochloric acid. A precipitate of 4-phenylbicyclo[2.2.2]octane-1-amine, hydrochloride separates as glistening leaflets. This is filtered and dried in vacuo at 60° C. The yield is 1.85 grams. Another 1.06 grams can be recovered from the filtrate. For purification, the crude material is recrystallized from water, giving colorless platelets, melting above 300° C.

*Analysis.*—Calc'd for $C_{14}H_{20}ClN$: N, 5.89. Found: N, 6.02.

*Example 2*

A 250-milliliter flask with reflux condenser, drying tube and stirrer is charged with 0.10 mole of 1-acetamido-4-phenylbicyclo[2.2.2]octane (see Example 1), 100 milliliters of diethylene glycol dimethyl ether, and 5.7 grams (0.15 mole) of lithium aluminum hydride. The mixture is heated for 8 hours at 60° C. and for 2 hours at 120° C. After cooling, the reaction mixture is treated with water to decompose the excess lithium aluminum hydride. The insoluble aluminum compounds are dissolved by adding a 20% solution of sodium potassium tartrate. The mixture is extracted with ether, the ether extract is dried with anhydrous potassium carbonate, and concentrated in vacuo. The residue is suspended in 50 milliliters of water, taken to pH 2 with concentrated hydrochloric acid, and the resulting solution is extracted with ether to remove any traces of unreacted starting material. The raffinate is concentrated in vacuo to yield solid N-ethyl-4-phenylbicyclo[2.2.2]octane-1-amine hydrochloride.

*Example 2A*

A 1000-ml. round-bottom flask is fitted with a stirrer, powder addition funnel, thermometer, condenser with drying tube, and a heating mantle, and is thoroughly dried by flaming while a stream of dry nitrogen is passed through the apparatus. It is allowed to cool, and then 250 ml. of diethylene glycol, dimethyl ether and 5.00 g. (0.13 mole) of lithium aluminum hydride are charged, the hydride in small portions. Then, 39.13 g. (0.16 mole) of 1-acetamido-4-phenylbicyclo[2.2.2]octane is charged from the powder addition funnel over a period of about ½ hour. The temperature at the end of charging is about 60° C. The mixture is stirred, heated to reflux, and held at reflux (160° C.) for two hours. It is cooled to 15° C. and 15 ml. of water is added dropwise, (cautiously), with stirring, followed by 25 g. of sodium potassium tartrate in 100 ml. of water, added all at once. The mixture, which contains some solids, is extracted with two 250-ml. and one 100-ml. portions of ether. The ether extracts are combined, washed with 300 ml. of water, and dried over potassium hydroxide pellets. The ether is vacuum-evaporated to yield 37 g. of crude N-ethyl-4-phenylbicyclo[2.2.2]octane-1-amine as a brown oil. This is taken up in a boiling solution of 200 ml. of conc. hydrochloric acid in 4800 ml. of water, is filtered hot to free the solution of a small amount of brown scum, and is allowed to cool to room temperature and crystallize. The crystals are filtered, washed with water and dried. The yield of N-ethyl-4-phenylbicyclo[2.2.2]octane-1-amine hydrochloride is 15.0 g. This is recrystallized from 450 ml. of butyl alcohol, to yield 10.5 g. of pure N-ethyl - 4 - phenylbicyclo[2.2.2]octane-1-amine hydrochloride, which does not melt at temperatures below 300° C.

*Analysis.*—Calc'd for $C_{16}H_{24}NCl$: C, 72.29; H, 9.10; N, 5.27. Found: C, 72.38; H, 9.26; N, 5.36.

*Example 3*

A solution of 0.10 mole of 4-phenylbicyclo[2.2.2]octane-1-amine (prepared by neutralization of an aqueous solution of the hydrochloride followed by ether extraction and then by evaporation of the ether) in 46.3 grams (1.0 mole) of 98–100% formic acid is allowed to stand 18 hours at room temperature. The mixture is concentrated in vacuo to give a residue of 1-formamido-4-phenylbicyclo[2.2.2]octane.

1-formamido-4-phenylbicyclo[2.2.2]octane is reduced to N-methyl-4-phenylbicyclo[2.2.2]octane-1-amine with lithium aluminum hydride by substituting this compound for 1-acetamido-4-phenylbicyclo[2.2.2]octane in the procedure of Example 2, using a 0.10 mole quantity.

*Example 3A*

A mixture of 7.19 g. (0.0358 mole) of 4-phenylbicyclo[2.2.2]octane-1-amine and 25 ml. of butyl formate is heated at reflux (110° C.) for 16 hours in a 100-ml. round bottom flask fitted with a thermometer, condenser with drying tube, heated with a mantle. The mixture is allowed to cool to room temperature, and the crystals which separate are filtered, washed with 10 ml. of 50% ethanol, and dried. The yield of 1-formamido-4-phenylbicyclo[2.2.2]octane, M.P. 172.5–173.5° C., is 4.45 g. (54%).

*Analysis.*—Calc'd for $C_{15}H_{19}NO$: C, 78.56; H, 8.35; N, 6.11. Found: C, 78.92; H, 8.39; N, 6.02.

A 100-ml. round-bottom flask is fitted with a thermometer, condenser with drying tube, and heating mantle, and arranged for magnetic stirring. The apparatus is flamed while dry nitrogen is passed through it, and is allowed to cool. It is charged with 35 ml. of anhydrous diethylene glycol, dimethyl ether, 1.03 g. (0.0270 mole) of lithium aluminum hydride, and 3.10 g. (0.0135 mole) of 1-formamido-4-phenylbicyclo[2.2.2]octane. The reaction mixture is stirred and heated at reflux (160° C.) for 2 hours, then cooled to 15° C., and the excess lithium aluminum hydride is destroyed by cautious dropwise addition of water while cooling and stirring. The mixture is transferred to a separatory funnel with 50 ml. of 10% sodium hydroxide and extracted with three 50-ml. portions of ether. The ether extracts are combined, washed with 30 ml. of water, and dried over solid potassium hydroxide. The ether is removed by vacuum-evaporation to yield a liquid residue, which is taken up in a hot solution of 10 ml. of conc. hydrochloric acid in 115 ml. of boiling water. The solution is filtered while hot and allowed to cool and crystallize. The crystals are filtered and dried. The yield of pure N-methyl-4-phenylbicyclo [2.2.2]octane-1-amine hydrochloride is 2.45 g. It does not melt below 300° C.

*Analysis.*—Calc'd for $C_{15}H_{22}NCl$: C, 71.55; H, 8.81; N, 5.56. Found: C, 71.70; H, 9.36; N, 5.58.

Example 3B

To a mixture of 3.56 g. (0.015 mole) of 4-phenylbicyclo[2.2.2]octane - 1 - amine hydrochloride, 1.2 g. (0.03 mole) of sodium hydroxide, and 40 ml. of water is added a solution of 1.82 g. (0.015 mole) of allyl bromide in 2 ml. of carbon tetrachloride. The mixture is heated under reflux overnight with vigorous stirring. The cooled mixture is extracted with 20 ml. of carbon tetrachloride. The carbon tetrachloride extract is dried with anhydrous magnesium sulfate, filtered, and concentrated to give an oily product. The pure N-allyl-4-phenylbicyclo[2.2.2] octane-1-amine obtained from the crude oil by means of preparative gas chromatography is dissolved in dry ether, and the ether solution is treated with dry hydrogen chloride gas. The N - allyl-4-phenylbicyclo[2.2.2]octane-1-amine hydrochloride is isolated by filtration and dried; M.P. 281–284°.

*Analysis.*—Calc'd for $C_{17}H_{24}ClN$: C, 73.49; H, 8.71; N, 5.04. Found: C, 73.20; H, 8.88; N, 5.07.

Example 4

A solution of 0.10 mole of N-methyl-4-phenylbicyclo [2.2.2]octane-1-amine in 46.3 grams (1.0 mole) of 98–100% formic acid is allowed to stand 18 hours at room temperature, and the mixture is concentrated in vacuo. The residue consists of N - methylformamido-4-phenylbicyclo[2.2.2]octane.

N - methylformamido-4-phenylbicyclo[2.2.2]octane is reduced to N,N-dimethyl-4-phenylbicyclo[2.2.2]octane-1-amine with lithium aluminum hydride by substituting this compound for 1-acetamido-4-phenylbicyclo[2.2.2]octane in the procedure of Example 2 using a 0.10 mole quantity.

Example 4A

A 100-ml. round-bottom flask is equipped with a stirrer, thermometer and condenser, and is arranged for heating on a steam bath. It is charged with 10.06 g. (0.050 mole) of 4-phenylbicyclo[2.2.2]octane-1-amine, 11.8 g. (0.25 mole) of 98% formic acid, and 19.7 g. (0.25 mole) of 37% formalin. The mixture is stirred and heated overnight on the steam bath, and is then cooled, transferred to a 500-ml. Erlenmeyer flask with 100 ml. of water, and made strongly basic with 50% sodium hydroxide, cooling the flask in ice. The cool solution is transferred to a separatory funnel and extracted with one 100-ml. and two 50-ml. portions of ether. The ether extracts are combined, washed with 10 ml. of water, and dried over solid potassium hydroxide. The ether is removed by vacuum-evaporation to yield a residue of colorless crystals. These are taken up in a hot solution of 25 ml. of conc. hydrochloric acid in 150 ml. of water, which is filtered hot and allowed to cool and crystallize. The crystals are filtered and dried to yield pure N,N-dimethyl-4-phenylbicyclo[2.2.2]octane-1-amine hydrochloride, M.P. 239.0–240.5° C. Analysis shows this material to contain ½ mole of water for each mole of amine hydrochloride.

*Analysis.*—Calc'd for $C_{16}H_{24}NCl \cdot \frac{1}{2}H_2O$: C, 69.91; H, 9.17. Found: C, 69.98; H, 9.26

Non-aqueous titration—Calc'd: 275. Found: 274.
Water (Karl Fisher)—Calc'd: 3.28. Found: 3.28.

Example 5

A 1000-ml. round-bottom flask is fitted with a stirrer, thermometer and a pressure-equalized dropping funnel, and is charged with 50.25 g. (0.25 mole) of 4-phenyl-bicyclo[2.2.2]octan-1-ol and 300 ml. of pyridine. The mixture is stirred until the solids dissolve, and then 57 g. (0.50 mole) of methanesulfonyl chloride is dropped in over a 15-minute period. A small amount of ice-water bath cooling is used to keep the temperature at 30° C. or below. The mixture is stirred for 4 hours at room temperature, and is then cooled in an ice-water bath and stirred while 50 ml. of water is added dropwise at such a rate that the temperature does not exceed 40° C. The mixture is then poured into a mixture of 1000 ml. of water plus 1000 g. of ice plus 1 lb. of conc. hydrochloric acid. The crystals which separate are filtered, washed well with water, and dried at 60° C./100 mm. The yield of 1-(methanesulfonyloxy) - 4 - phenylbicyclo[2.2.2]octane, M.P. 132.0–133.0° C., is 47 g. A small sample which is recrystallized from absolute ethanol has M.P. 133.0–134.5° C.

*Analysis.*—Calc'd for $C_{15}H_{20}O_3S$: C, 64.26; H, 7.19; S, 11.44. Found: C, 64.58; H, 7.13; S, 11.43.

A mixture of 10.0 g. of 1-(methanesulfonyloxy)-4-phenylbicyclo[2.2.2]octane and 37 g. of butylamine is heated and shaken at 200° C. in a sealed reactor ("Hastelloy" B) for 6 hours, and is then cooled. Volatile material is removed by vacuum-evaporation, and the residue is suspended in 70 ml. of 20% sodium hydroxide solution. The suspension is extracted with one 75-ml. and two 25-ml. portions of ether, and the ether extracts are combined, washed with 25 ml. of water, and dried over solid potassium hydroxide. The ether is removed by vacuum-evaporation to yield an oil, which is taken up in a boiling solution of 10 ml. of conc. hydrochloric acid in 1000 ml. of water. The boiling mixture is filtered to remove a small amount of insoluble oil, and is allowed to cool and crystallize. The crystals are filtered, washed with water, and dried at 60° C./100 mm. to give 4.55 g. of crude N-butyl-4-phenylbicyclo[2.2.2]octane-1-amine hydrochloride. After two recrystallizations from butyl alcohol, the pure amine hydrochloride melts at 245.5–246.5° C.

*Analysis.*—Calc'd for $C_{18}H_{28}NCl$: C, 73.57; H, 9.60; N, 4.77. Found: C, 73.85; H, 9.56; N, 4.82.

Example 6

A solution of 0.10 mole of N-methyl-4-phenylbicyclo [2.2.2]octane-1-amine in 75 milliliters of dry pyridine is stirred while 7.85 grams (0.10 mole) of acetyl chloride is added dropwise at such a rate that the temperature does not exceed 60° C. The mixture is then refluxed for ½ hour, cooled and poured into 500 milliliters of cold water. The resulting precipitate is filtered, washed well with water and dried to give 1-N-methylacetamido-4-phenylbicyclo[2.2.2]octane.

By using 0.10 mole of 1-N-methylacetamido-4-phenyl-bicyclo[2.2.2]octane for the 1-acetamido-4-phenylbicyclo [2.2.2]octane of Example 2, there is obtained N-ethyl-N-methyl-4-phenylbicyclo[2.2.2]octane-1-amine.

Example 6A

A 100-ml. round-bottom flask is equipped with a condenser and arranged for magnetic stirring and heating with a mantle. It is charged with 9.62 g. (0.0362 mole) of N - ethyl - 4 - phenylbicyclo[2.2.2]octane-1-amine hydrochloride, 17.70 g. (0.218 mole) of 37% formalin, 10.20 g. (0.218 mole) of 98% formic acid, and 2.72 g. (0.040 mole) or sodium formate. The mixture is stirred and heated at reflux for 4 hours. Gas is evolved during the heating-up period, and the solids dissolve. The mixture is cooled, 4 ml. of conc. hydrochloric acid is added, and the mixture is vacuum-evaporated to a pasty mass. This is transferred to a separatory funnel with a solution of 50 ml. of 50% sodium hydroxide in 100 ml. of water, and extracted with one 200-ml. portion and one 100-ml. portion of ether. Some solids remain. The ether extracts are combined, washed with 50 ml. of 5% sodium hydroxide, and dried over solid potassium hydroxide. The ether is removed by vacuum-evaporation to yield 6.92 g. of off-white crystals of crude N-ethyl-N-methyl-4-phenyl-bicyclo[2.2.2]octane-1-amine. This is taken up in a boiling solution of 25 ml. of conc. hydrochloric acid in 500 ml. of water, filtered hot, and allowed to cool. The solution is vacuum evaporated, and the residue is ground in ether and then filtered and dried to yield 7.25 g. of crude N - ethyl - N - methyl - 4 - phenylbicyclo[2.2.2]octane-1-amine hydrochloride, an off-white crystalline solid. Recrystallization of this material from 200 ml. of benzene yields 3.80 g. of pure N - ethyl-N-methyl-4-phenylbicyclo[2.2.2]octane-1-amine hydrochloride, M.P. 217.5–219.0° C.

*Analysis.*—Calc'd for $C_{17}H_{26}NCl$: C, 72.96; H, 9.36; N, 5.01. Found: C, 72.79; H, 9.51; N, 4.89.

Non-aqueous titration: Calc'd 280. Found 282.

*Example 7*

A solution of 0.1 mole of 4-phenylbicyclo[2.2.2]octane-1-amine in 50 milliliters of benzene is added slowly to a solution of 0.1 mole of succinic anhydride in 100 ml. of benzene. The mixture is then heated under reflux for one hour and the benzene removed by distillation. An excess of acetyl chloride, 0.15 mole, is added to the residue and the mixture heated under reflux on a steam bath for one hour. The excess acetyl chloride is distilled off at atmospheric pressure and the acetic acid formed by dehydration of the initially formed succinamic acid is removed at 100° C. under 15 mm. pressure. The residue is nearly pure N-(4-phenylbicyclo[2.2.2]-octyl-1-)succinimide. The crude product, after drying in a vacuum desiccator over solid sodium hydroxide pellets, is dissolved in dry tetrahydrofuran and added slowly to a suspension of 0.15 mole, an excess, of lithium aluminum hydride in diethyl ether. After complete addition, the reaction mixture is refluxed for 2 hours, the solvent is removed by distillation, and the amine is isolated by steam distillation. The steam distillate is extracted with ether, the solution is dried with sodium hydroxide, and dry hydrogen chloride is passed into the filtered solution until no more is absorbed. Evaporation of the ether yields N - (4-phenylbicyclo[2.2.2]octyl-1-)pyrrolidine, hydrochloride.

*Example 7A*

A mixture of 10.0 g. of 1-(methanesulfonyloxy)-4-phenylbicyclo[2.2.2]octane and 40 ml. of redistilled pyrrolidine is heated and shaken at 225° C. in a sealed reactor ("Hastelloy" B) for 6 hours, and is then cooled. The mixture is diluted with 200 ml. of water and 75 ml. of conc. hydrochloric acid, transferred to a separatory funnel and extracted with two 100-ml. portions of ether. The ether extracts are discarded. The aqueous layer is made strongly basic with 50% sodium hydroxide, and is extracted with two 100-ml. portions of ether. The ether extracts are combined, dried with solid potassium hydroxide, and the ether is removed by vacuum-concentration to yield 8.08 g. of a brown oil, crude N-(4-phenylbicyclo[2.2.2]octyl-1-)pyrrolidine. This is suspended in 25 ml. of water and the mixture is adjusted to pH 3 with about 4 ml. of conc. hydrochloric acid. The clear solution is vacuum-concentrated at 60° C. to a semi-crystalline mass, which is dried at 60°/100 mm. The dried solids are extracted with 400 ml. of boiling benzene, which is filtered hot, concentrated to 100 ml. by boiling, and allowed to cool and crystallize. The crystals are filtered and dried, yield 1.67 g. This is recrystallized from 200 ml. of benzene to yield 0.81 g. of pure N-(4-phenyl-bicyclo[2.2.2]octyl - 1-)pyrrolidine hydrochloride, M.P. 220–226° C.

*Analysis.*—Calc'd for $C_{18}H_{26}NCl$: C, 74.07; H, 8.98; N, 4.80. Found: C, 74.07, C, 74.09; H, 9.27, H, 9.23; N, 4.96.

*Example 8*

A mixture of 0.10 mole of 1-acetamido-4-phenyl-bicyclo[2.2.2]octane (see Example 1) and 100 ml. of concentrated sulfuric acid is cooled to −10° C. in "Dry-Ice"-acetone, and 9.0 g. (0.10 mole) of concentrated (70%) nitric acid is added dropwise with stirring. The temperature is kept between −10° and −15° C. during the addition. Then, the cooling bath is removed and, still stirring, the mixture is allowed to warm to room temperature and stir ½ hour. It is poured into 1000 ml. of ice and water, and the crystals which separate are filtered, washed with water, and dried in vacuo at 60° C. This product is 1 - acetamido - 4 - p - nitrophenylbicyclo[2.2.2]octane. It is purified (separating it from the considerably smaller amounts of the m-nitrophenyl and m-nitrophenyl isomers which are formed in the nitration) by recrystallization from absolute ethanol.

A mixture of 0.10 mole of 1-acetamido-4-p-nitrophenylbicyclo[2.2.2]octane and 200 ml. of 20% sulfuric acid is refluxed for 8 hours, then cooled, diluted with 1000 ml. of water and neutralized with 50% sodium hydroxide. The mixture is extracted with three 75-ml. portions of ether, which are combined, washed with water, dried with anhydrous magnesium sulfate, and concentrated in vacuo to yield 4 - p - nitrophenylbicyclo[2.2.2]octane-1-amine.

*Example 8A*

A container of a material resistant to hydrogen fluoride attack (as for example, platinum, "Hastelloy" steel, or polyethylene) is cooled with solid carbon dioxide and acetone and is charged with about 50 ml. of anhydrous hydrogen fluoride. The fluid is stirred and 10.50 g. (0.0432 mole) of 1-acetamido-4-phenylbicyclo[2.2.2]octane is added. Then 2 ml. (3.00 g., 0.043 mole) of fuming nitric acid (90%) is added slowly. The cooling bath is removed and the solution is allowed to stand for 16 hrs. The hydrogen fluoride is evaporated, the residue is dissolved in dichloromethane and is washed with 10% sodium carbonate solution. The dichloromethane solution is dried with anhydrous magnesium sulfate and evaporated. The residue is recrystallized from alcohol to give 8.73 g. of 1-acetamido-4-(p-nitrophenyl)bicyclo[2.2.2]-octane, M.P. 231–233° C. Further recrystallization raises the melting point to 235–236.5° C. The structure is confirmed by infrared spectroscopy and elemental analysis.

*Analysis.*—Calc'd for $C_{16}H_{20}N_2O_3$: C, 66.64; H, 6.99; N, 9.72. Found: C, 66.32; H, 7.12; N, 9.63.

The 1-acetamido - 4 - (p-nitrophenyl)bicyclo[2.2.2]octane is hydrolyzed to 4-(p-nitrophenyl)bicyclo[2.2.2]octan-1-amine as described in Example 8 or as in Example 8B below.

*Example 8B*

A mixture of 2.88 g. (0.010 mole) of 1-acetamido-4-(p-nitrophenyl)bicyclo[2.2.2]octane is refluxed with 50 ml. of 48% hydrobromic acid for 24 hrs. The mixture is cooled, the crystals are filtered off to give 4-(p-nitrophenyl)bicyclo[2.2.2]octane-1-amine hydrobromide. The hydrobromide salt is converted to the hydrochloride salt by adding the crystals to a stirred mixture of saturated potassium carbonate solution and ether. The ether extract is dried with anhydrous potassium carbonate and is then treated with anhydrous hydrogen chloride to periciptate 4-(p-nitrophenyl)bicyclo[2.2.2]octane - 1 - amine hydrochloride, M.P. 328–330° C. (dec.).

Example 9

A mixture of 0.10 mole of 4-p-nitrophenylbicyclo[2.2.2]octane-1-amine, 200 ml. of absolute ethanol and 20 ml. of settled W–6 Raney nickel catalyst (J. Am. Chem. Soc., 70, 695 (1948)) is hydrogenated at 50 p.s.i. and 50° C. until hydrogen uptake is complete. The solution is filtered and the filtrate is concentrated in vacuo to give 4-p-aminophenylbicyclo[2.2.2]octane-1-amine.

Example 10

A mixture of 0.10 mole of 1-acetamido-4-p-nitrophenylbicyclo[2.2.2]octane, 200 ml. of absolute ethanol and 20 ml. of settled W–6 Raney nickel catalyst is hydrogenated at 50 p.s.i. and 50° C. until hydrogen uptake is complete. The solution is filtered and the filtrate is concentrated in vacuo to give 1-acetamido-4-p-aminophenylbicyclo[2.2.2]octane. Refluxing this compound in 10% sodium hydroxide for 8 hours yields 4-p-aminophenylbicyclo[2.2.2]octane-1-amine, the product of Example 9.

A solution of 0.10 mole of 1-acetamido-4-p-aminophenylbicyclo[2.2.2]octane in 46.3 g. (1.0 mole) of 98–100% formic acid is allowed to stand 18 hours at room temperature. The mixture is concentrated in vacuo to give a residue of 1-acetamido-4-p-formamidophenylbicyclo[2.2.2]octane.

1-acetamido-4-p-formamidophenylbicyclo[2.2.2]octane is reduced to N-ethyl-4-(p-methylaminophenyl)bicyclo[2.2.2]octane-1-amine by substituting this compound for 1-acetamido-4-phenylbicyclo[2.2.2]octane in the procedure of Example 2, using a 0.10 mole quantity and doubling the amount of lithium aluminum hydride.

Example 10A

To a solution of 2.88 g. (0.010 mole) of 1-acetamido-4-(p-nitrophenyl)bicyclo[2.2.2]octane and 2 ml. of hydrazine hydrate in 100 ml. of alcohol at 70° C. is added W–6 Raney nickel until evolution of gases commences. The mixture is refluxed and after 10 minutes an additional 2 ml. of hydrazine hydrate is added. The mixture is refluxed for 30 minutes and is allowed to cool. The catalyst is filtered off, and the filtrate is evaporated. The residue is recrystallized from toluene to give 2.26 g. of 1-acetamido-4-(p-aminophenyl)bicyclo[2.2.2]octane, M.P. 191.5–192.5° C.

*Analysis.*—Calc'd for $C_{16}H_{22}N_2O$: C, 74.38; H, 8.58; N, 10.84. Found: C, 74.47; H, 8.74; N, 10.91.

A solution of 2.58 g. (0.010 mole) of 1-acetamido-4-(p-aminophenyl)bicyclo[2.2.2]octane, 3 g. (0.10 mole) of sodium hydroxide, and 20 ml. of methanol is heated in a closed vessel at 200° C. for 8 hrs. The product is dissolved in a mixture of 150 ml. of saturated potassium carbonate solution, 50 ml. of water, and 200 ml. of acetonitrile. The organic layer is separated, dried with anhydrous potassium carbonate, and evaporated. The residue is dissolved in 50 ml. of 1 N hydrochloride acid, and conc. hyrochloric acid is added to precipitate 4-(p-aminophenyl)bicyclo[2.2.2]octane-1-amine dihydrochloride, dec. 420° C.

*Analysis.*—Calc'd for $C_{14}H_{20}N_2 \cdot 2HCl$: C, 58.13; H, 7.67; N, 9.68. Found: C, 57.92; H, 7.68; N, 9.74.

Example 11

A solution of 0.10 mole of N-ethyl-4-(p-methylaminophenyl)bicyclo[2.2.2]octane-1 amine in 75 ml. of dry pyridine is stirred while 15.70 g. (0.20 mole) of acetyl chloride is added dropwise at such a rate that the temperature does not exceed 60° C. The mixture is then refluxed for one-half hour, cooled and poured into 500 ml. of cold water. The resulting precipitate is filtered, washed with water, and dried to give 1-N-ethylacetamido-4-(p-N-methylacetamidophenyl)bicyclo[2.2.2]octane. This is reduced to N,N-diethyl-4-(p-ethylmethylaminophenyl)bicyclo[2.2.2]-octane-1-amine in the procedure of Example 2, using a 0.10 mole quantity and doubling the amount of lithium aluminum hydride.

Example 12

A mixture of 19.6 g. (0.20 mole) of sulfuric acid, 100 ml. of water and 0.10 mole of 1-acetamido-4-p-aminophenylbicyclo[2.2.2]octane is stirred and cooled to 5° C. with an ice-water bath. Then, a solution of 10.2 g. (0.11 mole) of sodium nitrite in 25 ml. of water is added slowly, with stirring, keeping the temperature at 5° C. The mixture is allowed to stir one-half hour at 5°, and is then heated to 50° C. on the steam bath, and held at 50° C. for one-half hour. It is cooled and extracted with three 50-ml. portions of ether, and the ether extracts are combined, washed with 25 ml. of water, dried with anhydrous magnesium sulfate, and concentrated in vacuo to give a residue of 1-acetamido-4-p-hydroxyphenylbicyclo[2.2.2]octane.

A mixture of 0.10 mole of 1-acetamido-4-p-hydroxyphenylbicyclo[2.2.2]octane, 100 ml. of diethylene glycol, and 25 grams of sodium hydroxide is refluxed for 48 hours, then cooled and diluted with 300 ml. of water. The mixture is adjusted to pH 8.5 with conc. hydrochloric acid, and then extracted with three 50-ml. portions of ether. The ether extracts are combined, washed with 25 ml. of water, dried with anhydrous magnesium sulfate, and concentrated in vacuo to give a residue of 4-p-hydroxyphenylbicyclo[2.2.2]octane-1-amine.

Example 12A

A mixture of 5.20 g. (0.020 mole) of 1-acetamido-4-(p-aminophenyl)bicyclo[2.2.2]octane and 100 ml. of 1 N $H_2SO_4$ is stirred and cooled to 5° C. with an ice-water bath. Then a solution of 1.40 g. (0.020 mole) of sodium nitrite in 40 ml. of water is added slowly with stirring so that the temperature does not exceed 5° C. Then 200 ml. of water is added and the mixture is refluxed for 30 min. The precipitate is filtered off and is washed with water. The solid is heated with 200 ml. of 10% sodium hydroxide solution in an autoclave at 220° C. for 4 hrs. The product is cooled to room temperature and the precipitate is filtered off and washed with water. The precipitate is added to 1 N hydrochloric acid, heated to effect solution, and allowed to cool. The crystals of 4-(p-hydroxyphenyl)bicyclo[2.2.2]octan-1-amine hydrochloride are filtered off, washed with water, and dried. The product decomposes on heating.

*Analysis.*—Calc'd for $C_{14}H_{19}NO \cdot HCl$: C, 66.26; H, 7.95; N, 5.52. Found: C, 66.50; H, 8.03; N, 5.57.

Example 13

A mixture of 0.10 mole of 1-acetamido-4-p-hydroxyphenylbicyclo[2.2.2]octane, 100 ml. of water, and 5.0 g. of sodium hydroxide is stirred and cooled at 5° C. while 12.6 g. (0.10 mole) of dimethyl sulfate is added dropwise. It is stirred 15 minutes at 5° C., then warmed to 75° for 1 hour on the steam bath. The mixture is cooled, extracted with three 50-ml. portions of ether, and the ether extracts are combined, washed with 25 ml. of water, dried with anhydrous magnesium sulfate, and concentrated in vacuo to give a residue of 1-acetamido-4-p-methoxyphenylbicyclo[2.2.2]octane.

A mixture of 0.10 mole of 1-acetamido-4-p-methoxyphenylbicyclo[2.2.2]octane, 100 ml. of diethylene glycol and 25 g. of sodium hydroxide is refluxed for 48 hours, then cooled and diluted with 300 ml. of water. It is extracted with three 50-ml. portions of ether, and the ether extracts are combined, washed with 25 ml. of water, and dried with anhydrous magnesium sulfate. Concentration in vacuo gives a residue of 4-p-methoxyphenylbicyclo[2.2.2]octane-1-amine.

Example 14

A mixture of 19.6 g. (0.20 mole) of sulfuric acid, 100 ml. of water and 0.10 mole of 1-acetamido-4-p-aminophenylbicyclo[2.2.2]octane is stirred and cooled to 5° C.

with an ice bath. Then, a solution of 10.2 g. (0.11 mole) of sodium nitrite in 25 ml. of water is added slowly, with stirring, keeping the temperature at 5°. This solution is added to a cold (5° C.) solution of freshly prepared cuprous chloride (0.15 mole), dissolved in 50 ml. of concentrated hydrochloric acid, stirred well, and the mixture is allowed to warm to room temperature. After standing 15 minutes at room temperature, the mixture is heated to 60° C. for one-half hour, then cooled to room temperature, and extracted with three 50-ml. portions of ether. The ether extracts are combined, washed with 25 ml. of water, dried with anhydrous magnesium sulfate, and concentrated in vacuo to give a residue of 1-acetamido-4-p-chlorophenylbicyclo[2.2.2]octane.

A mixture of 0.10 mole of 1-acetamido-4-p-chlorophenylbicyclo[2.2.2]octane, 100 ml. of diethylene glycol and 25 g. of sodium hydroxide is refluxed for 48 hours, then cooled and diluted with 300 ml. of water. It is extracted with three 50-ml. portions of ether, and the ether extracts are combined, washed with 25 ml. of water, dried with anhydrous magnesium sulfate, and concentrated in vacuo to give a residue of 4-p-chlorophenylbicyclo[2.2.2]octane-1-amine.

*Example 14A*

A mixture of 12.9 g. (0.050 mole) of 1-acetamido-4-(p-aminophenylbicyclo[2.2.2]octane and 250 ml. of conc. hydrochloric acid is cooled to 0° C., and a solution of 3.5 g. of sodium nitrite in 20 ml. of water is dropped in. The mixture is stirred for 20 min. Then a solution of 5.0 g. of cuprous chloride in 250 ml. of conc. hydrochloric acid is dropped into the solution rapidly. The mixture is allowed to warm to room temperature and then is heated at 55° C. for 16 hours or until no further evolution of nitrogen is observed. The mixture is extracted with chloroform, and the extract is washed with water, dried with water, dried with anhydrous magnesium sulfate, and evaporated. The residue is recrystallized from acetonitrile to give 1-acetamido-4-(p-chlorophenyl)bicyclo[2.2.2]octane, M.P. 230–233° C.

1-acetamido - 4 - (p-chlorophenyl)bicyclo[2.2.2]octane is hydrolyzed and converted to the hydrochloride salt by the method described in Example 8B to give 4-(p-chlorophenyl)bicyclo[2.2.2]octan-1-amine hydrochloride, M.P. 324–325° C. (dec.).

*Example 15*

Substitution of 0.10 mole of freshly prepared cuprous bromide in a mixture of 45 g. of conc. sulfuric acid and 500 ml. of water for the cuprous chloride in hydrochloric acid solution of Example 14 gives 1-acetamido-4-p-bromophenylbicyclo[2.2.2]octane, which is hydrolyzed with diethylene glycol and sodium hydroxide in the manner of that example to wield 4-p-bromophenylbicyclo[2.2.2]octane-1-amine.

*Example 15A*

4-(p-bromophenyl)bicyclo[2.2.2]octane - 1 - amine can be conveniently prepared by direct bromination of 1-acetamido-4-phenylbicyclo[2.2.2]octane. To a solution of 12.2 g. (0.050 mole) of 1-acetamido-4-phenylbicyclo-[2.2.2]octane in 50 ml. of liquid anhydrous hydrogen fluoride is added 8.0 g. (0.050) mole of bromine. A small amount of iron powder is added and the mixture is stirred overnight. The hydrogen fluoride is evaporated and the residue is dissolved in chloroform. The chloroform solution is washed with 1 N hydrochloric acid, dried with anhydrous magnesium sulfate, and evaporated. The residue is recrystallized from alcohol to give 8.73 g. of 1-acetamido - 4 - (p-bromophenyl)bicyclo[2.2.2]octane, M.P. 242–244° C.

*Analysis.*—Calc'd for $C_{16}H_{20}BrNO$: C, 59.63; H, 6.26; N, 4.35. Found: C, 59.57; H, 6.39; N, 4.36.

1 - acetamido-4-(p-bromophenyl)bicyclo[2.2.2]-octane is hydrolyzed with 48% hydrobromic acid and converted to the hydrochloride salt as described in Example 8B. The product is 4 - (p - bromophenyl)bicyclo[2.2.2]octane-1-amine hydrochloride, M.P. 325° C. (dec.).

*Analysis.*—Calc'd for $C_{14}H_{18}BrN \cdot HCl$: C, 53.10; H, 6.05; N, 4.41. Found: C. 53.08; H, 6.16; N, 4.46.

*Example 16*

A 0.10 mole quantity of 1-acetamido-4-p-aminophenylbicyclo[2.2.2]octane is diazotized as in Example 14, and the cold diazonium salt solution is added slowly to a 60° C. solution of 0.20 mole of freshly prepared cuprous cyanide solution in a mixture of 20 g. of sodium cyanide and 75 ml. of water in a flask arranged for steam distillation. The temperature is maintained at 60° C. for one-half hour, then it is raised to reflux for 1 hour, and finally the mixture is steam-distilled. The steam distillate is cooled, extracted with three 50-ml. portions of ether, and the ether extracts are combined, washed with 25 ml. of water, dried with anhydrous magnesium sulfate, and concentrated in vacuo to give a residue of 1-acetamido-4-p-cyanophenylbicyclo[2.2.2]octane.

A mixture of 0.10 mole of 1-acetamido-4-p-cyanophenylbicyclo[2.2.2]octane, 100 ml. of diethylene glycol and 25 g. of sodium hydroxide is refluxed for 48 hours, then cooled and diluted with 300 ml. of water, and adjusted to pH 8.5 with conc. hydrochloric acid. The mixture is extracted with three 50-ml. portions of ether and the ether extracts are combined, washed with 25 ml. of water, dried with anhydrous magnesium sulfate, and concentrated in vacuo to give a residue of 4-p-carboxyphenylbicyclo-[2.2.2]octane-1-amine.

*Example 16A*

A suspension of 9.68 g. (0.0375 mole) of 1-acetamido-(4-aminophenyl)bicyclo[2.2.2]octane in 50 ml. of 6 N HCl is cooled to 5° C. and diazotized with 2.58 g. (0.0374 mole) of sodium nitrite. Then the solution is made alkaline with potassium carbonate solution. The mixture is then poured with stirring into 150 ml. of cold cuprous cyanide (prepared as described in Organic Syntheses, Collective Volume I, p. 514). The mixture is allowed to warm to room temperature and stirring is continued for 24 hrs. The solid material is filtered off, washed with water, and dried. The product is recrystallized from xylene to give 4.66 g. of 1 - acetamido-4-(p-cyanophenyl)bicyclo[2.2.2]-octane, M.P. 267–269° C.

*Analysis.*—Calc'd for $C_{17}H_{20}N_2O$: C, 76.08; H, 7.51; N, 10.44. Found: C, 76.24; H, 7.85; N, 11.03.

*Example 17*

Hydrogen chloride gas is passed into a solution of 0.10 mole of 4-p-carboxyphenylbicyclo[2.2.2]octane in 100 ml. of absolute ethanol, with cooling, until the solution is saturated at room temperature. After allowing the mixture to stand 48 hours at room temperature, the mixture is concentrated in vacuo to yield a residue of 4-p-ethoxy carboxylphenylbicyclo[2.2.2]octane-1-amine, hydrochloride.

*Example 17A*

1 - acetamido-4-(p-cyanophenyl)bicyclo[2.2.2]octane is hydrolyzed by 48% hydrobromic acid and converted to the hydrochloride salt by the method described in 8B. The product is 4 - (p-carboxyphenyl)bicyclo[2.2.2]octane-1-amine hydrochloride, dec. 350° C. The structure of the product is confirmed by its infrared spectrum.

*Analysis.*—Calc'd for $C_{15}H_{19}NO_2 \cdot HCl$: C, 63.93; H, 7.15; N, 4.97. Found: C, 63.46; H, 7.09; N, 5.27.

*Example 18*

A 145-ml. Hastelloy bomb is charged with 0.10 mole of 4-p-carboxyphenylbicyclo[2.2.2]octane-1-amine, 45 ml. of nitromethane, and 43 g. (0.40 mole) of sulfur tetrafluoride. It is closed and heated at 150° C. for 8 hours. After cooling and venting, the solvent and excess sulfur tetrafluoride are removed by concentration in vacuo and the residue is treated with 400 ml. of ice-cold 20% sodium hydroxide. This is extracted with three 50-ml. portions of ether, and the ether extracts are combined, washed with 25 ml. of water, dried with anhydrous magnesium sulfate, and concentrated in vacuo to give a residue of 4-p-trifluoromethylphenylbicyclo[2.2.2]octane-1-amine.

*Example 18A*

A suspension of 10.3 g. (0.040 mole) of 1-acetamido-4-(p-aminophenyl)bicyclo[2.2.2]octane in 50 ml. of 6 N hydrochloric acid is cooled to 5° C. and diazotized with 2.76 g. (0.040 mole) of sodium nitrite. Then 10 ml. of 65% hexafluorophosphoric acid solution is added, and the precipitate is filtered off, washed with water, and dried. The dry precipitate, suspended in 200 ml. of s-tetrachloroethane, is refluxed for 2 hrs. and then allowed to cool. The solvent is evaporated off and the residue is chromatographed on silicic acid with chloroform. There is obtained 6.14 g. of 1-acetamido-4-(p-fluorophenyl)-bicyclo[2.2.2]octane, M.P. 189–191° C.

*Analysis.*—Calc'd for $C_{16}H_{20}NOF$: C, 73.53; H, 7.71; N, 5.37. Found: C, 73.13; H, 7.76; N, 5.39.

A mixture of 2.61 g. of 1-acetamido-4-(4-fluorophenyl) bicyclo[2.2.2]octane, 25 ml. of diethylene glycol, 1 ml. of water, and 2 g. of sodium hydroxide is refluxed for 16 hrs. The product is poured into ice-water and extracted with ether. Evaporation of the ether gives a residue that is soluble in hot 3 N hydrochloric acid. On cooling, the solution gives colorless crystals of 4-(p-fluorophenyl) bicyclo[2.2.2]octan-1-amine hydrochloride, dec. 335° C. The structure is confirmed by infrared spectroscopy.

*Analysis.*—Calc'd for $C_{14}H_{18}FN \cdot HCl$: C, 65.74; H, 7.49; N, 5.48. Found: C, 65.50; H, 7.64; N, 5.61.

*Example 18B*

To a solution of 24.3 g. of 1-acetamido-4-phenylbicyclo [2.2.2]octane in 100 ml. of anhydrous, liquid hydrogen fluoride is added 15.7 g. of acetyl chloride. Boron trifluoride is passed into the solution and the mixture is stirred for 16 hrs. The boron trifluoride and hydrogen fluoride are evaporated. The residue is dissolved in chloroform, and the solution is washed with potassium carbonate solution and evaporated. The residue is recrystallized from xylene to give 19 g. of 1-acetamido-4-(p-acetylphenyl)-bicyclo[2.2.2]octane, M.P. 209–212° C.

The structure is confirmed by infrared spectroscopy.

A mixture of 2.85 g. of 1-acetamido-4-(p-acetylphenyl)-bicyclo[2.2.2]octane and 1 g. of 10% palladium on carbon in 200 ml. of alcohol is hydrogenated at 3 atm. for 16 hrs. The catalyst is filtered off and the filtrate is evaporated. The residue is recrystallized from heptane to give 2.20 g. of 1-acetamido-4-(p-ethylphenyl)bicyclo[2.2.2] octane, M.P. 156–157° C. The structure is confirmed by infrared spectroscopy.

1 - acetamido - 4-(p-ethylphenyl)bicyclo[2.2.2]octane is hydrolyzed by the method described in Example 8B to give 4-(p-ethylphenyl)bicyclo[2.2.2]octane-1-amine hydrochloride, M.P. 355–359° C. (dec.).

*Analysis.*—Calc'd for $C_{16}O_{23}N \cdot HCl \cdot \frac{1}{4}H_2O$: C, 71.09; H, 9.13; N, 5.18; Cl, 13.11. Found: C, 70.85; H, 9.02; N, 5.22; Cl, 12.90.

*Example 18C*

A solution of 40 g. of ethyl 4-phenylbicyclo[2.2.2]oct-2-ene-1-carboxylate (prepared according to the method described in application S.N. 377,132) in 100 ml. of ethanol is hydrogenated for 16 hrs. at atmospheric pressure. A solution of 0.2 M chloroplatinic acid initially is added to the solution until uptake of hydrogen commences. The catalyst is filtered off and the solvent is evaporated. The residue is recrystallized from methanol to give 22.2 g. of ethyl 4-phenylbicyclo[2.2.2]octane-1-carboxylate, M.P. 68–69° C.

A mixture of 11 g. of ethyl 4-phenylbicyclo[2.2.2] octane-1-carboxylate and 1000 ml. of 2 N sodium hydroxide solution is refluxed for 16 hrs. with stirring. The mixture is allowed to cool slightly and is acidified with conc. HCl so that the temperature is held at 80–100° C. Cooling the acidified solution gives 9.0 g. of 4-phenylbicyclo[2.2.2]octan-1-carboxylic acid, which can be purified by recrystallization from acetic acid to give crystals, M.P. 277–279° C. A sample purified for analysis melts at 282–284° C.

*Analysis.*—Calc'd for $C_{15}H_{18}O_2$: C, 78.23; H, 7.88; mol. wt., 230. Found: C, 77.76; H, 7.71; mol. wt., 226.

4-phenylbicyclo[2.2.2]octan-1-amine can be prepared conveniently from 4-phenylbicyclo[2.2.2]octane-1-carboxylic acid by the well-known Schmidt reaction. To a mixture of 0.024 mole of the acid, 41 ml. of conc. sulfuric acid, and 80 ml. of chloroform is added with stirring at 50–55° C., 0.042 mole of sodium azide in small portions. After all the azide is added, the mixture is heated for another 30 min. at 50° C., diluted with ice, and made alkaline. The reaction mixture is steam-distilled and the distillate is made strongly acid with concentrated hydrochloric acid. A precipitate of 4-phenylbicyclo[2.2.2]octan-1-amine hydrochloride separates. The product is identical with that obtained as described in Example 1.

*Example 18D*

Substitution of ethyl 4-tolylbicyclo[2.2.2]oct-2-ene 1-carboxylate (prepared according to the method described in application S.N. 377,132) for ethyl 4-phenylbicyclo [2.2.2]oct-2-ene-1-carboxylate in the previous procedure gives 4-tolylbicyclo[2.2.2]octane-1-amine hydrochloride.

*Example 18E*

To a mixture of 7.7 g. (0.10 mole) of fuming nitric acid and 100 ml. of concentrated sulfuric acid cooled to 0° C. in an ice bath is added in portions 0.050 mole of 4-phenylbicyclo[2.2.2]octane-1-carboxylic acid. The mixture is stirred for one hour and then is poured into one liter of ice-water. The precipitate is filtered off, washed with water, and dried. The precipitate is recrystallized from toluene to give 4-(2,4-dinitrophenyl)bicyclo[2.2.2] octan-1-carboxylic acid as pale yellow crystals, M.P. 242.5–245° C.

*Analysis.*—Calc'd for $C_{15}H_{16}N_2O_6$: C, 56.25; H, 5.04; N, 8.75. Found: C, 56.61; H, 5.09; N, 8.37.

To a mixture of 0.024 mole of 4-(2,4-dinitrophenyl)-bicyclo[2.2.2]octane-1-carboxylic acid, 41 ml. of conc. sulfuric acid, and 80 ml. of chloroform is added with stirring at 50–55° C., 0.042 mole of sodium azide in small portions. After all of the azide is added, the mixture is heated for another 30 mins. at 50° C., diluted with ice, and made alkaline. The organic material is extracted with chloroform, and the extract is dried with anhydrous potassium carbonate and evaporated. The residue is extracted with hot 1 N HCl and the extract is allowed to cool. The precipitate is filtered off, washed with water, and dried to give 4-(2,4-dinitrophenyl)bicyclo[2.2.2]octan-1-amine hydrochloride.

*Example 18F*

1-acetamido-4(p-fluorophenyl)bicyclo[2.2.2] - octane is nitrated as described in the previous example. The product is a mixture of isomers, which is separated by chromatography to give 1-acetamido-4(4-fluoro-2-nitrophenyl)-bicyclo[2.2.2]octane and 1-acetamido-4-(4-fluoro-3-nitrophenyl)bicyclo[2.2.2]octane. Hydrolysis of these compounds with 48% hydrobromic acid and conversion to the hydrochloride salts by the procedure described in Example 8B gives respectively 4-(4-fluoro-2-nitrophenyl)bicyclo[2.2.2]octan-1 - amine hydrochloride and 4-(4 - fluoro-3 - nitrophenyl)bicyclo[2.2.2]octan - 1-amine hydrochloride.

*Example 18G*

Reduction of 1 - acetamido-4-(2-nitro-4-fluorophenyl)bicyclo[2.2.2]octane and 1-acetamido-4-(3-nitro-4-fluorophenyl)bicyclo[2.2.2]octane by the procedure described in Example 10A gives respectively 1-acetamido-4-(2-amino-4-fluorophenyl)bicyclo[2.2.2]octane and 1-acetamido-4-(3-amino-4 - fluorophenyl)bicyclo[2.2.2]octane. Hydrolysis by the procedure described in Example 8B gives respectively 4-(2-amino - 4 - fluorophenyl)bicyclo [2.2.2]octan-1-amine dihydrochloride and 4-(3-amino-4-fluorophenyl)bicyclo[2.2.2]octan-1 - amine dihydrochloride.

*Example 18H*

Diazotozation, pyrolysis of the diazonium hexafluorophosphate salts, and hydrolysis by the procedure of Example 18A of 1-acetamido-4-(2-amino-4 - fluorophenyl)-bicyclo[2.2.2]octane and 4-(3-amino-4-fluorophenyl)bicyclo[2.2.2]octane gives respectively 4-(2,4-difluorophenyl)bicyclo[2.2.2]octan-1-amine hydrochloride and 4-(3,4-difluorophenyl)bicyclo[2.2.2]octan - 1 - amine hydrochloride.

*Example 18I*

Bromination of 1-acetamido-4-tolylbicyclo[2.2.2]octane by the procedure described in Example 15A gives a mixture of 1-acetamido-4-(2-bromotolyl)bicyclo[2.2.2]octane and 1-acetamido-4-(3 - bromotolyl)bicyclo[2.2.2]octane, which can be separated by chromatography. Hydrolysis of each isomer by the procedure described in Example 8B gives respectively 4-(2-bromotolyl)bicyclo[2.2.2]octan-1-amine hydrochloride and 4-(3-bromotolyl)bicyclo[2.2.2]octan-1-amine hydrochloride.

*Example 18J*

A mixture of 0.1 mole of 1-acetamido-4-(p-hydroxyphenyl)bicyclo[2.2.2]octane, 20 ml. of benzene, 15 ml. of H$_2$O, and 15 ml. of conc. nitric acid is stirred at room temperature for one hour. The mixture is diluted and extracted with benzene. The benzene extract is dried with anhydrous magnesium sulfate and evaporated to give 1-acetamido-4-(4-hydroxy-3 - nitrophenyl)bicyclo[2.2.2]octane. Hydrolysis by the procedure in Example 8A gives 4-(4-hydroxy-3 - nitrophenyl)bicyclo[2.2.2]octan-1-amine hydrochloride.

*Example 18K*

A mixture of 0.05 mole of 1-acetamido-4-hydroxy-3-nitrophenyl)bicyclo[2.2.2]octane, 0.05 mole of methyl sulfate and 0.10 mole of potassium hydroxide dissolved in 50 ml. of water is heated gradually to 90° until the color of the solution changes and the product separates. The solution is cooled, diluted, and extracted with ether. The ether extract is washed with water, dried with anhydrous magnesium sulfate and evaporated to give 1-acetamido-4-(4-methoxy-3-nitrophenyl)bicyclo[2.2.2]octane. Hydrolysis of the product according to the procedure described in Example 8B gives 4-(4-methoxy-3-nitrophenyl)bicyclo [2.2.2]octan-1-amine hydrochloride.

*Example 18L*

Reduction of 1-acetamido-4-(4-methoxy-3-nitrophenyl)bicyclo[2.2.2]octane with hydrazine hydrate and Raney nickel as described in procedure 10A gives 1-acetamido-4-(3-amino - 4 - methoxyphenyl)bicyclo[2.2.2]octane. Hydrolysis of the reduction product according to the procedure in Example 8B gives 4-(3-amino-4-methoxyphenyl) bicyclo[2.2.2]octan-1-amine dihydrochloride.

*Example 18M*

Hydrolysis of the diazonium compound from 1-acetamido-4-(3 - amino-4 - methoxyphenyl)bicyclo[2.2.2]octane, carried out according to the procedure described in Example 12, gives 1-acetamido-4-(3-hydroxy-4-methoxyphenyl)bicyclo[2.2.2]octane. Purification is effected by chromatography. The product is hydrolyzed with 48% hydrobromic acid and converted to the hydrochloride salt according to the procedure in Example 8B to give 4-(3-hydroxy-4-methoxyphenyl)bicyclo[2.2.2]octan - 1 - amine hydrochloride.

*Example 19*

A mixture of 0.10 mole of 4-phenylbicyclo[2.2.2]octane-1-amine and 9.87 g. (0.10 mole) of 38% hydrochloric acid in 100 ml. of water is concentrated in vacuo at 60° C. The resulting salt, 4-phenylbicyclo[2.2.2]octane-1-amine hydrochloride, is dried in vacuo at 60° C.

*Example 20*

A solution of 0.20 mole of 4-phenylbicyclo[2.2.2]octane-1-amine, hydrochloride in 200 ml. of hot water is added to a solution of 0.10 mole of pamoic acid, disodium salt [4,4'-methylenebis-(3-hydroxy-2-naphthoic acid), disodium salt] in 500 ml. of water. The resulting precipitate is filtered, washed well with water, and dried in vacuo at 60° C. to give 4-phenylbicyclo[2.2.2]octane - 1 - amine, pamoate.

*Example 21*

Carbon dioxide is passed into a solution of 0.10 mole of 4-phenylbicyclo[2.2.2]octane-1-amine in 100 ml. of ether until precipitation is complete. The precipitate is filtered and dried in vacuo at 60° C., to give 4-phenylbicyclo[2.2.2]octane-1-amine, bicarbonate.

*Example 22*

Hydrogen chloride (0.10 mole) is passed into a solution of 0.10 mole of 4-phenylbicyclo[2.2.2]octane-1-amine in 100 ml. of ether. The precipitate is filtered and dried in vacuo at 60° C. to give 4-phenylbicyclo[2.2.2]-octane-1-amine, hydrochloride.

*Examples 23–31*

Example 19 is repeated substituting the following indicated reactants for those of that example, to obtain the indicated product:

| Example No. | Product of Example— | Acid | Product |
|---|---|---|---|
| 23 | 2 (free base) (0.10 mole) | 85% phosphoric acid (0.10 mole) | N-ethyl-4-phenylbicyclo[2.2.2]octane-1-amine, phosphate. |
| 24 | 3 (0.10 mole) | Sulfuric acid (0.050 mole) | N-methyl-4-phenylbicyclo[2.2.2]octane-1-amine, sulfate. |
| 25 | 4 (0.10 mole) | Tartaric acid (0.10 mole) | N,N-dimethyl-4-phenylbicyclo[2.2.2]octane-1-amine, bitartrate. |
| 26 | 5 (0.10 mole) | Tartaric acid (0.050 mole) | N-butyl-4-phenylbicyclo[2.2.2]octane-1-amine, tartrate. |
| 27 | 6 (0.10 mole) | Maleic acid (0.050 mole) | N-ethyl-N-methyl-4-phenylbicyclo[2.2.2]octane-1-amine, maleate. |
| 28 | 7 (0.10 mole) | Acetic acid (0.10 mole) | N-(4-phenylbicyclo[2.2.2]octyl-1-)pyrrolidine, acetate. |
| 29 | 8 (0.10 mole) | Succinic acid (0.050 mole) | 4-p-nitrophenylbicyclo[2.2.2]octane-1-amine, succinate. |
| 30 | 9 (0.10 mole) | Mandelic acid (0.10 mole) | 4-p-aminophenylbicyclo[octane-1-amine, mandelate]. |
| 31 | 13 (0.10 mole) | Lactic acid | 4-p-methoxyphenylbicyclo[2.2.2]octane-1-amine, lactate. |

The preceding examples can be repeated substituting equivalent amounts of appropriate starting materials to obtain other compounds of this invention including those listed hereinbefore.

The compounds of this invention can be administered for antidepressant effect according to this invention by any suitable means. For example, administration can be parenterally, that is subcutaneously, intravenously, intramuscularly, or intraperitoneally. Alternatively or concurrently, administration can be by the oral route.

The dosage of compounds for this invention administered to the warm-blooded animal will depend on the age, health and weight of the said warm-blooded animal recipient, the frequency of administration and the intensity of the anti-depressant response desired. Generally, a daily dosage of active ingredient compound will be from about 0.05 to 50 mg. per kg. of body weight, although lower, such as 0.01 mg./kg., or higher amounts can be used. Ordinarily, from 0.1 to 20 and preferably 0.1 to 5 mg./kg. per day, in one or more applications per day, is effective to obtain the desired result.

The hydrochloride salt of 4-phenylbicyclo[2.2.2]octane-1-amine, a compound for this invention, strongly indicates anti-depressant activity as demonstrated in mouse tests where a single oral dose of the above named compound, in a concentration of 0.5 mg. per kg. of body weight, administered orally demonstrated successful protection against tetrabenazine induced sedation.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. In the capsule will be from about 1–50% by weight of a compound of Formula 1 or 2 and 99–50% of a carrier. In another embodiment, the active ingredient is tableted with or without adjuvants. In yet another embodiment, the active ingredient is put into powder packets and employed. These capsules, tablets and powders will generally constitute from about 1% to about 95% and preferably from 1% to 50% by weight of active ingredient. These dosage forms preferably contain from about 1 to about 500 mg. of active ingredient, with from about 1 to about 100 most preferred.

The pharmaceutical carrier can, as previously indicated, be a sterile liquid such as water and oils, including those of petroleum, animal, vegetable or synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline will ordinarily contain from about 0.05% to 10%, and preferably about 0.1 to 1% by weight of the active ingredient.

As mentioned above, oral administration can be in a suitable suspension or syrup, in which the active ingredient ordinarily will constitute from about 0.02 to 10%, and preferably about 0.1 to 1% by weight. The pharmaceutical carrier in such composition can be a watery vehicle such as an aromatic water, a syrup or a pharmaceutical mucilage.

Suitable pharmaceutical carriers are described in "Remington's Practice of Pharmacy" by E. W. Martin and E. F. Cook, a well known reference text in this field.

In addition to the exemplary illustrations above, the following examples further explain one aspect of the present invention:

*Example 32*

A large number of unit capsules are prepared for oral administration by filling standard two-piece hard gelatin capsules weighing about 30 mg. each with 5 mg. of powdered 4-phenylbicyclo[2.2.2]octane-1-amine, hydrochloride, 100 mg. of lactose and 0.2 mg. of "Cab-o-sil" finely divided silica.

*Example 33*

A large number of unit capsules are prepared for oral administration by filling soft gelatin capsules with a solution of 4-phenylbicyclo[2.2.2]octane-1-amine in mineral oil.

*Example 34*

Example 32 is repeated except that the dosage unit is 5 mg. of active ingredient, 5 mg. of gelatin, 3 mg. of magnesium stearate and 100 mg. of mannitol, mixed and formed into a tablet by a conventional tableting machine. Slow release pills or tablets can also be used, by applying appropriate coatings.

*Example 35*

A parenteral composition suitable for administration by injection is prepared by stirring 0.5% by weight of the active ingredient of Example 32 in sterile aqueous 0.9% saline.

A large variety of compositions according to this invention can thus readily be made by substituting other compounds of this invention, and including specifically but not limited to compounds of this invention that have specifically been named hereinbefore. The compounds will be used in the amounts indicated in accordance with procedures well known and described in the Martin and Cook text mentioned above.

The above and similar examples can be carried out in accordance with the teachings of this invention, as will be readily understood by persons skilled in the art, by substitution of components and amounts in place of those specified. Thus, the foregoing detailed description has been given for clearness of understanding only and no unnecessary limitations are to be understood therefrom.

The embodiments of the invention in which an exclusive property or privilege is claimed are defined as follows:

1. A method of producing an anti depressant effect in warm-blooded animals comprising administering to said warm-blooded animal an anti depressant effective amount of a compound of the formula

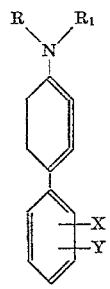

where
R and $R_1$ are selected from the group consisting of hydrogen, alkyl of 1 through 4 carbon atoms and allyl, and where R and $R_1$ can be joined together to form —$(CH_2)_n$— where $n$ is a positive integer of 4 through 6;
X and Y are selected from the group consisting of hydrogen, methyl, ethyl, cyano, chlorine, bromine, fluorine, trifluoromethyl, nitro, amino, monoalkylamino where said alkyl has 1 through 4 carbons, dialkylamino where said alkyl has 1 through 4 carbons, hydroxy, alkoxy of 1 through 4 carbons, carboxy and alkoxycarbonyl where said alkyl has 1 through 2 carbons; and
the non-toxic salts of the basic compounds of said formula formed with pharmaceutically acceptable acids.

2. The method of claim 1 wherein the compound is 4-phenylbicyclo[2.2.2]octane-1-amine.

3. The method of claim 1 wherein the compound is 4-phenylbicyclo[2.2.2]octane-1-amine hydrochloride.

4. The method of claim 1 wherein the compound is 4-p-fluorophenylbicyclo[2.2.2]octane-1-amine.

5. The method of claim 1 wherein the compound is 4-p-fluorophenylbicyclo[2.2.2]octane-1-amine hydrochloride.

6. The method of claim 1 wherein the compound is 4-p-hydroxyphenylbicyclo[2.2.2]octane-1-amine.

7. The method of claim 1 wherein the compound is 4-p-hydroxyphenylbicyclo[2.2.2]octane-1-amine hydrochloride.

8. The method of claim 1 wherein the compound is 4-p-nitrophenylbicyclo[2.2.2]octane-1-amine.

9. The method of claim 1 wherein the compound is 9. 4-p-nitrophenylbicyclo[2.2.2]octane-1-amine hydrochloride.

10. The method of claim 1 wherein the compound is 4-p-tolylbicyclo[2.2.2]octane-1-amine.

11. The method of claim 1 wherein the compound is 4-p-tolylbicyclo[2.2.2]octane-1-amine hydrochloride.

12. The method of claim 1 wherein the compound is N-methyl-4-phenylbicyclo[2.2.2]octane-1-amine.

13. The method of claim 1 wherein the compound is N-methyl-4-phenylbicyclo[2.2.2]octane-1-amine hydrochloride.

14. The method of claim 1 wherein the compound is N-ethyl-4-phenylbicyclo[2.2.2]octane-1-amine.

15. The method of claim 1 wherein the compound is 4-ethyl-4-phenylbicyclo[2.2.2]octane-1-amine hydrochloride.

16. The method of claim 1 wherein the compound is 4-p-methoxy-phenylbicyclo[2.2.2]octane-1-amine.

17. The method of claim 1 wherein the compound is 4-p-methoxy-phenylbicyclo[2.2.2]octane-1-amine hydrochloride.

18. The method of claim 1 wherein the compound is 4-p-trifluoromethylphenylbicyclo[2.2.2]octane-1-amine.

19. The method of claim 1 wherein the compound is 4-p-trifluoromethylphenylbicyclo[2.2.2]octane-1-amine hydrochloride.

20. A composition comprising from 1 to 50% by weight of a compound of the formula

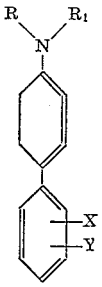

where:

R and $R_1$ are selected from the group consisting of hydrogen, alkyl of 1 through 4 carbon atoms and allyl, and where R and $R_1$ can be joined together to form —$(CH_2)_n$— where $n$ is a positive integer of 4 through 6;

X and Y are selected from the group consisting of hydrogen, methyl, ethyl, cyano, chlorine, bromine, fluorine, trifluoromethyl, nitro, amino, monoalkylamino where said alkyl has 1 through 4 carbons, dialkylamino where said alkyl has 1 through 4 carbons, hydroxy, alkoxy of 1 through 4 carbons, carboxy and alkoxycarbonyl where said alkyl has 1 through 2 carbons; and the non-toxic salts of the basic compounds of said formula formed with pharmaceutically acceptable acids; and from 99 to 50% by weight of a non-toxic pharmaceutical carrier for said compound.

21. The composition of claim 20 in tablet form containing from 1 to 500 milligrams of a compound defined in claim 20 and at least one pharmaceutical carrier selected from the group consisting of gelatin, lactose and magnesium stearate.

22. The composition of claim 20 in the form of a sterile injectable solution containing from 0.05 to 10% by weight of a compound defined in claim 20 dissolved in sterile saline.

References Cited

FOREIGN PATENTS 1,110,159   1/1962   Germany.
1,110,160   3/1962   Germany.

OTHER REFERENCES

J. D. Roberts et al.: J.A.C.S., 75, page 637 (1953).

ALBERT T. MEYERS, *Primary Examiner.*

S. J. FRIEDMAN, *Assistant Examiner.*